United States Patent [19]
Chon et al.

[11] Patent Number: 6,009,043
[45] Date of Patent: Dec. 28, 1999

[54] CROSS-WELL CONNECTIVITY MAPPING INCLUDING SEPARATION OF COMPRESSIONAL AND SHEAR WAVE ENERGY

[75] Inventors: Yu Taik Chon, Houston; Walter R. Turpening, Stafford; Tawassul A. Khan, Cypress, all of Tex.

[73] Assignee: Western Atlas International, Inc., Houston, Tex.

[21] Appl. No.: 09/056,010

[22] Filed: Apr. 3, 1998

Related U.S. Application Data

[62] Division of application No. 08/705,780, Aug. 30, 1996, Pat. No. 5,740,125.

[51] Int. Cl.$^6$ .................................................. G01V 1/40
[52] U.S. Cl. .............................. 367/75; 367/57; 367/59; 364/421
[58] Field of Search ................................ 367/75, 57, 59; 364/421

[56] References Cited

U.S. PATENT DOCUMENTS

| | | | |
|---|---|---|---|
| 4,870,580 | 9/1989 | Lang et al. | 367/57 |
| 5,144,590 | 9/1992 | Chon | 367/75 |

*Primary Examiner*—Christine Oda
*Assistant Examiner*—Anthony Jolly
*Attorney, Agent, or Firm*—Richard A. Fagin

[57] ABSTRACT

A method of determining the continuity of earth formations between wellbores by analyzing seismic energy imparted to the formations. The energy is imparted to the formations at a plurality of depths in one wellbore and is received at a plurality of depths in another wellbore. Compressional and shear components of the seismic energy received in the other wellbore are separated. A frequency spectrum is determined for the compressional component and the shear component of the seismic energy at each selected depth. Common imparted depth stacks of the compressional components and shear components are assembled at the depths at which the seismic energy is imparted. Common received depth stacks of the compressional components and the shear components are assembled at the selected depths at which the energy is received. The assembled common imparted depth stacks of the compressional components and the shear components are plotted and the assembled common received depth stacks of the compressional components and shear components are plotted. Formations having related frequency spectra of the compressional components and formations having related frequency spectra of the shear components may be detected.

10 Claims, 4 Drawing Sheets

# CROSS-WELL CONNECTIVITY MAPPING INCLUDING SEPARATION OF COMPRESSIONAL AND SHEAR WAVE ENERGY

CROSS-REFERENCE TO RELATED APPLICATIONS

This is a division of application Ser. No. 08/705,780 filed on Aug. 30, 1996, now U.S. Pat. No. 5,740,125.

BACKGROUND OF THE INVENTION

1. Field of the Invention

The invention is related to the field of seismic energy mapping of earth formations. More specifically, the invention is related to methods of determining geologic interconnection of an earth formation reservoir between wellbores by measuring seismic energy transmission properties of the earth formations between wellbores.

2. Description of the Related Art

Subterranean earth formations sometimes contain zones permeable to fluid flow called reservoirs. Wellbores are drilled into reservoirs for extracting the fluids, which can include commercially useful materials such as petroleum. Wellbore operators are particularly concerned about the geologic structure of reservoirs, as this structure affects the placement of the wellbores used to extract the fluids.

Various methods are known in the art for inferring the geologic structure of the reservoir from measurements made at the earth's surface, such as reflection seismic surveying. Other methods include correlation between wellbores of measurements made from within the wellbores, these measurements being made from various types of well logging instruments known in the art.

The methods of well logging and seismic surveying generally are not able to determine whether a reservoir is geologically continuous between two particular wellbores. Knowledge of the existence of geologic continuity may be important to the wellbore operator to properly place any additional wellbores. A method of mapping geologic continuity is described in U.S. Pat. No. 5,144,590 issued to Chon. The method disclosed in the Chon '590 patent includes inserting a seismic energy source into one wellbore which penetrates the reservoir, and measuring the seismic energy which travels to receivers placed in another wellbore which also penetrates the reservoir. The spectral characteristics of the energy which reaches the receivers as it travels from the source can be analyzed to determine if the reservoir is geologically continuous between the wellbores.

A limitation to the method described in the Chon '590 patent is that it uses all the energy from the source to determine connectivity between wellbores. In certain cases the reservoir may be geologically connected between the wellbores but the fluid which is present in the reservoir between the wellbores may not be continuous. A connectivity map based on all the energy transmitted between wellbore might indicate geologic discontinuity in such a case even though the reservoir is hydraulically continuous between the wellbores.

Another limitation of the method in the Chon '590 patent can be illustrated by a case in which the mineral content of the formation from which reservoir is composed changes between the wellbores. In this case the method in the Chon patent may also indicate geologic discontinuity between the wellbores while again, in fact, the reservoir is hydraulically continuous between the wellbores.

What is needed is an extension of the method described in the Chon '590 patent which enables the user to determine geologic continuity even when there is a fluid content of mineralogical change in the reservoir between wellbores.

SUMMARY OF THE INVENTION

The invention is a method of determining the continuity of earth formations between wellbores by analyzing seismic energy imparted to the formations and transmitted between wellbores. The seismic energy is imparted to the formations at a plurality of depths in a first wellbore. The seismic energy is received at a plurality of depths in another wellbore. Compressional and shear wave components of the seismic energy which is received in the second wellbore are separated. A frequency spectrum is determined for both the compressional component and for the shear component of the seismic energy at each selected depth. Common imparted depth stacks of the compressional components and the shear components are assembled for the depths at which the seismic energy is imparted. Common received depth stacks of the compressional components and the shear components are assembled for the selected depths at which the seismic energy is received. The assembled common imparted depth stacks of the compressional components and the shear components are plotted, and the assembled common received depth stacks of the compressional components and shear components are plotted. Formations having related frequency spectra of the compressional components and formations having related frequency spectra of the shear components may be detected.

A specific embodiment of the invention includes receiving the seismic energy in the second wellbore using multi-component geophones and separating the compressional components and the shear components by generating hodograms of the received seismic energy.

Another embodiment of the invention includes generating compressional/shear amplitude ratio spectra after separating the compressional and shear components and determining their respective spectra. Common imparted depth and common received depth stacks are assembled for the amplitude ratio spectra for the selected depths. The common imparted depth and common received depth stacks can be plotted to identify subsurface formations having particular continuity features.

DESCRIPTION OF THE PREFERRED EMBODIMENT

Figure 1A:
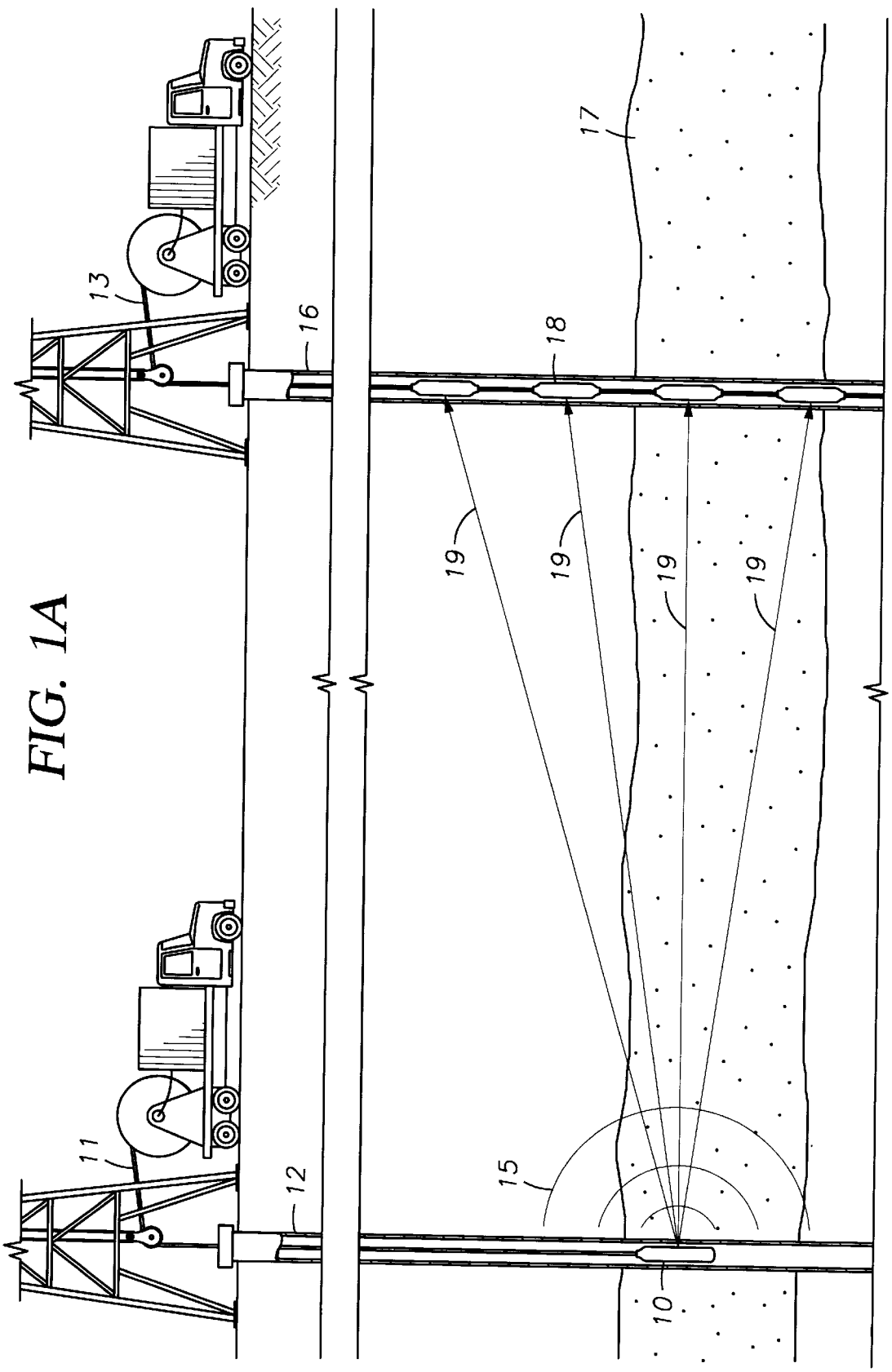
FIG. 1A shows the manner in which seismic signals for the invention are acquired.
Figure 1B:
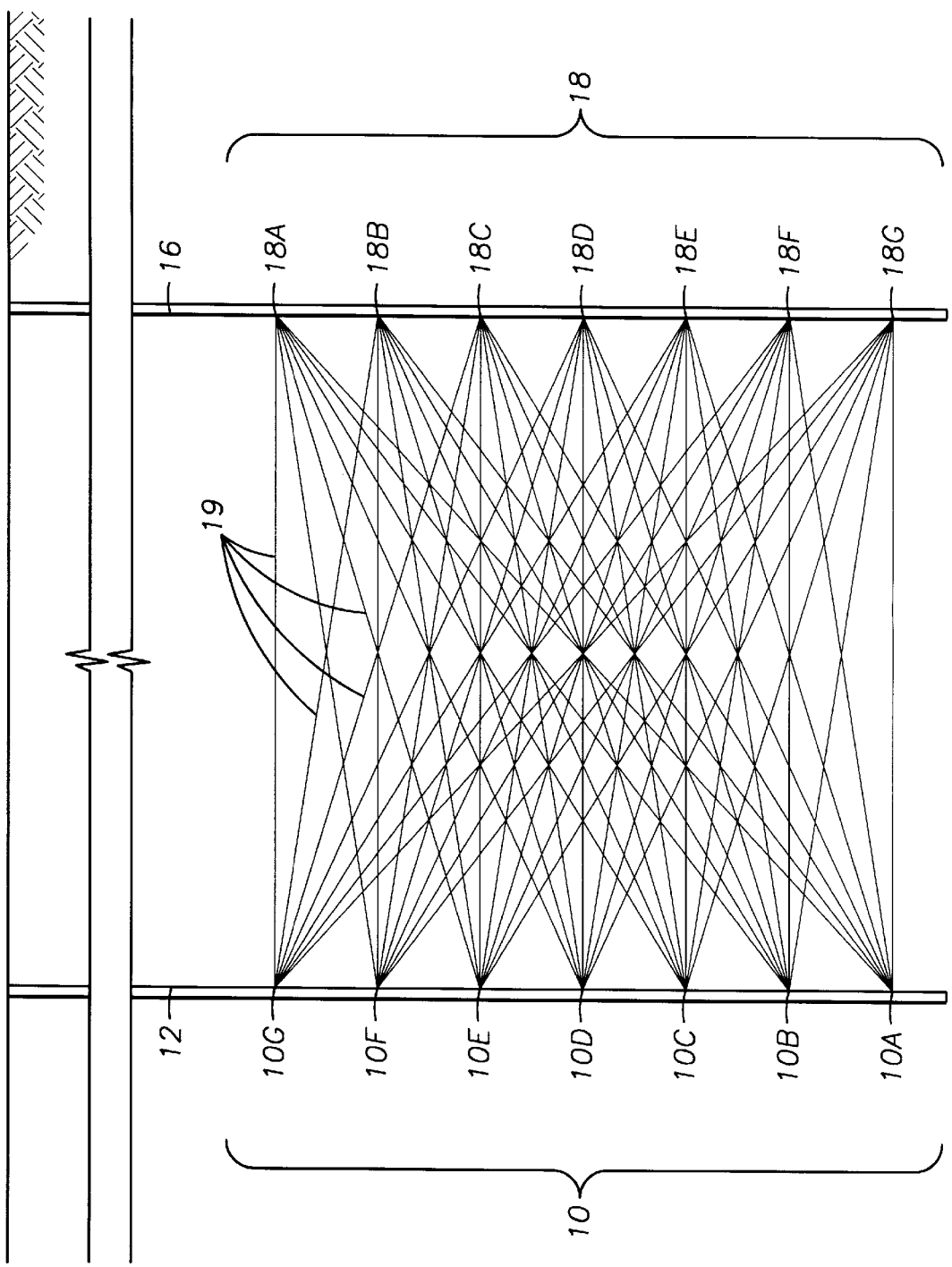
FIG. 1B shows ray paths for selected depths in each wellbore for which the seismic energy is imparted and received.

The invention uses signals resulting from seismic energy transmitted between wellbores. The seismic signals can be acquired by applying seismic energy at various depths within a first wellbore drilled through earth formations and receiving the energy transmitted through the earth formations in a second wellbore drilled through the earth formations, located some distance from the first wellbore. A method for acquiring suitable seismic signals for the method of the invention is described in U.S. Pat. No. 5,144,590 issued to Chon. This method is illustrated in FIGS. 1A and 1B. In FIG. 1A, a seismic energy source 10 is shown positioned at selected depths in the first wellbore 12 drilled through earth formations including a reservoir, shown generally at 17. The source 10 can be any one of a number of various types known in the art such as vibrators, sparkers and explosives. Preferably the source 10 generates seismic energy having a frequency range from 10 to 50 Hz at the lower end, up to about 2,000 to 3,000 Hz. The source 10 can be extended into and withdrawn from the first wellbore 12 by means of an armored electrical cable 11 or any similar conveyance known in the art. The second wellbore 16 can be located some distance from the first wellbore 12 and is shown in FIG. 1A as penetrating the reservoir 17. A seismic receiver, shown generally at 18, can be positioned at selected depths in the second wellbore 16. In FIG. 1A the receiver 18 is shown as including four individual receiver units, but the number of receiver units in the receiver 18 is not to be construed as a limitation on the invention. As few as one receiver unit could be used, but for reasons of convenience and economy of operation, the receiver 18 preferably includes as many receiver units as can be practically inserted into the second wellbore 16 at one time. A receiver having five such receiver units is described, for example in a sales brochure entitled *Multilevel Receiver,* Western Atlas Logging Services, Houston, Tex., 1994. The receiver 18 can also be extended into and withdrawn from the wellbore by means of an armored electrical cable 13 or similar conveyance known in the art. The receiver 18 can include hydrophones, or preferably, can include a plurality of geophones each sensitive to motion along one sensitive axis. A preferred type of receiver which can perform the measurements needed for the invention is described in the *Multilevel Receiver* reference, supra.

The source 10 is periodically energized to emit seismic energy, shown as waves 15, into the earth formations. The seismic waves 15 travel through the formations and eventually reach the receiver 18. Excluding, for the sake of description, the effects of any refraction which may take place, the seismic waves 15 generally travel along shortest paths, shown at 19 between the source 10 and the receiver 18. One of the receiver units will generally be located along one of the shortest paths 19 to the second wellbore 16.

During acquisition of seismic signals for the invention, the source 10 can be energized a plurality of times, the energy received at the various receiver units, and the receiver 18 can be moved to a new selected depth level within the second wellbore 16 whereupon the process can be repeated. The source 10 can then be moved to a different selected depth within the first wellbore 12, and energized while the receiver is again positioned at its previous selected depths so that the seismic energy can travel along alternate shortest paths 19. The method of surveying at a plurality of different selected receiver depths and selected source depths can be better understood by referring to FIG. 1B. The various depths at which the receiver units are located are shown at 18A through 18G. At each selected receiver unit depth, such as 18A, the source (10 in FIG. 1A) can be energized at its own selected depth such as 10A, and then moved to a new selected depth such as 10B, and the energizing and receiving process can be repeated, until all the selected source depths, 10B through 10G, desired to be surveyed by the system operator have been covered. The receiver (18 in FIG. 1A) can then be moved to its next location, such as 18B, and the process repeated until all the selected receiver depths, through 18G, have also been covered.

The seismic waves (15 in FIG. 1A), depending on the type of source 10, can include compressional energy or shear energy, or a combination of the two types of energy. Additionally, some types of source which generate primarily compressional energy, if actuated within a fluid (not shown) which may fill the first wellbore 12, may generate shear energy as a result of interaction of the compressional energy at the interface between the formation and the fluid. This interface is the wall of the first wellbore 12. As a result, both compressional energy and shear energy can travel through the formation to the receiver (18 in FIG. 1A). Signals generated by the receiver 18 in response to the seismic energy can contain components of shear and of compressional energy.

After the seismic signals have been obtained and recorded, the invention includes separating the signal components in each individual receiver signal which result from the compressional energy from the signal components which result from the shear energy. Methods of separating the compressional signal components (P) from the shear signal components (S) are known in the art. The separation method selected will depend on, among other things, whether the receiver (18 in FIG. 1A) includes hydrophones or multi-component geophones. If the receiver 18 includes hydrophones, compressional and shear (P/S) signal component separation can be performed by velocity filtering. Methods of velocity filtering are known in the art. Velocity filtering can separate the P and S components because as is known in the art, compressional energy travels through earth formations approximately twice as fast as shear energy.

Alternatively, if the receiver 18 includes multi-component geophones, the P and S signal component separation can be performed by identifying the direction of motion of the particles of the formation with respect to the direction of propagation of the seismic energy. In general, compressional energy will have particle motion substantially parallel to the direction of propagation of the seismic energy. Shear energy, on the other hand, will have particle motion substantially perpendicular to the direction of propagation of the energy. Geophones, in the second wellbore 16, which are oriented to be sensitive to particle motion parallel to direction of propagation between the source 10 and the receiver 18 will detect the compressional energy. Geophones oriented to be sensitive to particle motion substantially perpendicular to the direction of propagation will detect the shear energy. If the geophones are oriented at an oblique angle relative to the direction of propagation, methods are known in the art, such as hodogramming, for resolving the direction of particle motion from the signals of the individual geophones. See, for example, Bob A. Hardage, *Vertical Seismic Profiling,* Geophysical Press, London, 1983, pp 308–309.

After the P and S signal components are separated, the frequency spectrum can be determined for each of the signal components. Determining the frequency spectrum can be performed by fast Fourier transform, or similar spectral analysis method known in the art. The result of the spectral analysis typically consists of a relationship of signal component amplitude with respect to frequency. This relationship can be presented graphically or can be presented as a series of ordered pairs representing frequency and amplitude. As a matter of convenience for the system operator, a third relationship can be generated from the P and S spectra of the ratio of P component amplitude to the S component amplitude (the P/S ratio), or its inverse the S/P ratio.

Analysis of the individual signal component spectra can then be performed by a method described in U.S. Pat. No. 5,144,590 issued to Chon, incorporated herein by reference. Briefly, the spectra of the P-, S- and P/S ratio-components with respect to frequency can be summed or "stacked" for each interval representing a common depth in the first wellbore 12 for the source 10. The spectra representing common receiver 18 depths in the second wellbore 16 can also be stacked. The stacked common source depth spectra can be compared to the stacked common receiver depth spectra for each depth interval which falls within a search aperture between the first 12 and the second 16 wellbores. A measure of the degree to which the common source spectra and the common receiver spectra are the same is indicative of the degree of continuity of the reservoir (17 in FIG. 1B) between the first 12 and second 16 wellbores.

Figure 2:
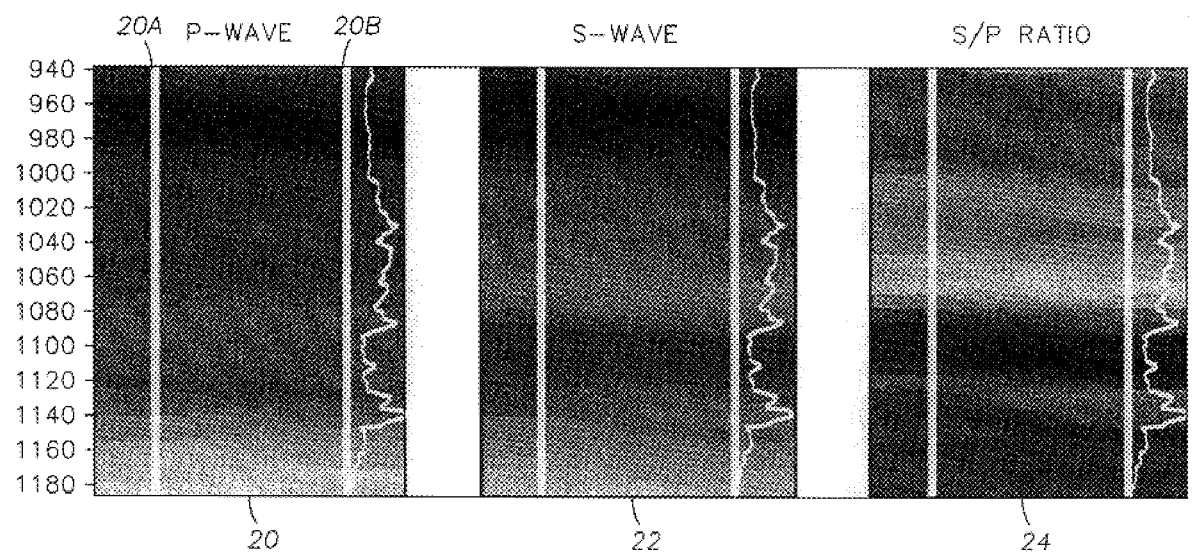
FIG. 2 shows a sample of connectivity maps generated with separated compressional and shear wavefields, and a connectivity map from the ratio of compressional to shear amplitude.

Examples of "connectivity map" plots for the P-, S- and P/S ratio components generated by the method in the Chon '590 patent are shown in FIG. 2. A P-component connectivity map is shown at 20. S-component and S/P ratio component (which is functionally equivalent to the P/S ratio component) connectivity maps are shown, respectively, at 22 and 24.

It has been determined that features corresponding to significant features in the reservoir 17 which are identifiable in separate P- and S-spectral connectivity mapping may not be identifiable in connectivity maps generated by the method of the prior art, which included analyzing composite spectra consisting of both the P- and S-components. An example of a feature which may be identified by separate P- and S-component connectivity mapping is a case where the reservoir 17 is substantially filled with gas where it intersects the first 12 and second 16 wellbores, but includes a water bearing interval located between the first 12 and second 16 wellbores. A connectivity map generated according to the prior art would typically indicate a lack of connectivity between the wellbores 12, 16 because the attenuation of the compressional energy by the reservoir 17 is dependent on the fluid content of the reservoir. In the invention, however, the S-component connectivity map would indicate full connectivity between the wellbores because the shear energy attenuation is substantially unaffected by the fluid contained in the pore spaces of the formation. A P-component connectivity map of the same signals would indicate a lack of connectivity between the wellbores in this situation. Indications of connectivity on the S-component map combined with indications of no connectivity on the P-component map is indicative of this feature, whereas the prior art method would merely indicate a lack of geologic continuity between wellbores.

Another subsurface feature which may be identified using the invention is a displacement discontinuity, known as a "leaking fault", in the layers of the formation which is permeable to fluid. Generally, fault discontinuities provide hydraulic isolation between the formation layers located on opposite sides of the fault. In the case of an hydraulically isolating fault, the S-component map would indicate hydraulic continuity across the fault. If the fault is a leaking one, however, fluid moving along the fault plane will act as a barrier to transmission of shear energy across the fault plane. The S-component connectivity map generated according to the invention would indicate lack of connectivity between two wellbores separated by a leaking fault.

DESCRIPTION OF AN ALTERNATIVE EMBODIMENT

It is possible to generate connectivity maps by a different method than the one disclosed in the Chon '590 patent, supra. Referring again to FIG. 1A, for each position of the source 10 and receiver 18, an individual fastest path, shown at 19 is followed by the seismic energy as it travels from the source 10 to the receiver 18. During recording of a survey, the source 10 is moved to various depths within the first wellbore 12, and the receiver 18 is moved to various depths within the second wellbore 16. The signal generated by the receiver 16 for each individual combination of source depth and receiver depth can be referred to as a "trace" for convenience of the following description.

Each individual trace can be spectrally analyzed. Spectral analysis can be performed using a fast Fourier transform or similar technique known in the art. Each spectrally analyzed trace can then be analyzed to estimate the transitivity of the energy from the source 10 to the receiver 18. A technique for estimating transmissivity is described, for example in Y. -T. Chon, *Crosswell Bed Connectivity Analysis,* Transactions of the 63rd Annual Meeting, Society of Exploration Geophysicists, 1993. Generally, the frequency spectrum of the transmitted signal for each trace $P_{ij}(\omega)$ (where index i represents the source position and index j represents the receiver position) is related to the source 10 spectrum $S_i(\omega)$, the received signal spectrum $R_j(\omega)$ and the transmissivity function $C_{ij}(\omega)$ by the relationship:

$$P_{ij}(\omega)=S_i(\omega)C_{ij}(\omega)R_j(\omega) \qquad (1)$$

In a simple case where the source output and the receiver response are substantially invariant, the transmissivity function can be estimated by subtracting an average spectrum of the source for a number of traces from the spectrum of the trace for which the transmissivity is to be estimated. As the source output and receiver response are not invariant, iterative solutions can be used to improve the quality of calculation of the transmissivity function. One such method is described in R. A. Wiggins et al, *Residual Statics Analysis as a General Linear Inverse Problem,* Geophysics, vol. 41, pp. 922–938, Society of Exploration Geophysicists, 1976.

Figure 3:
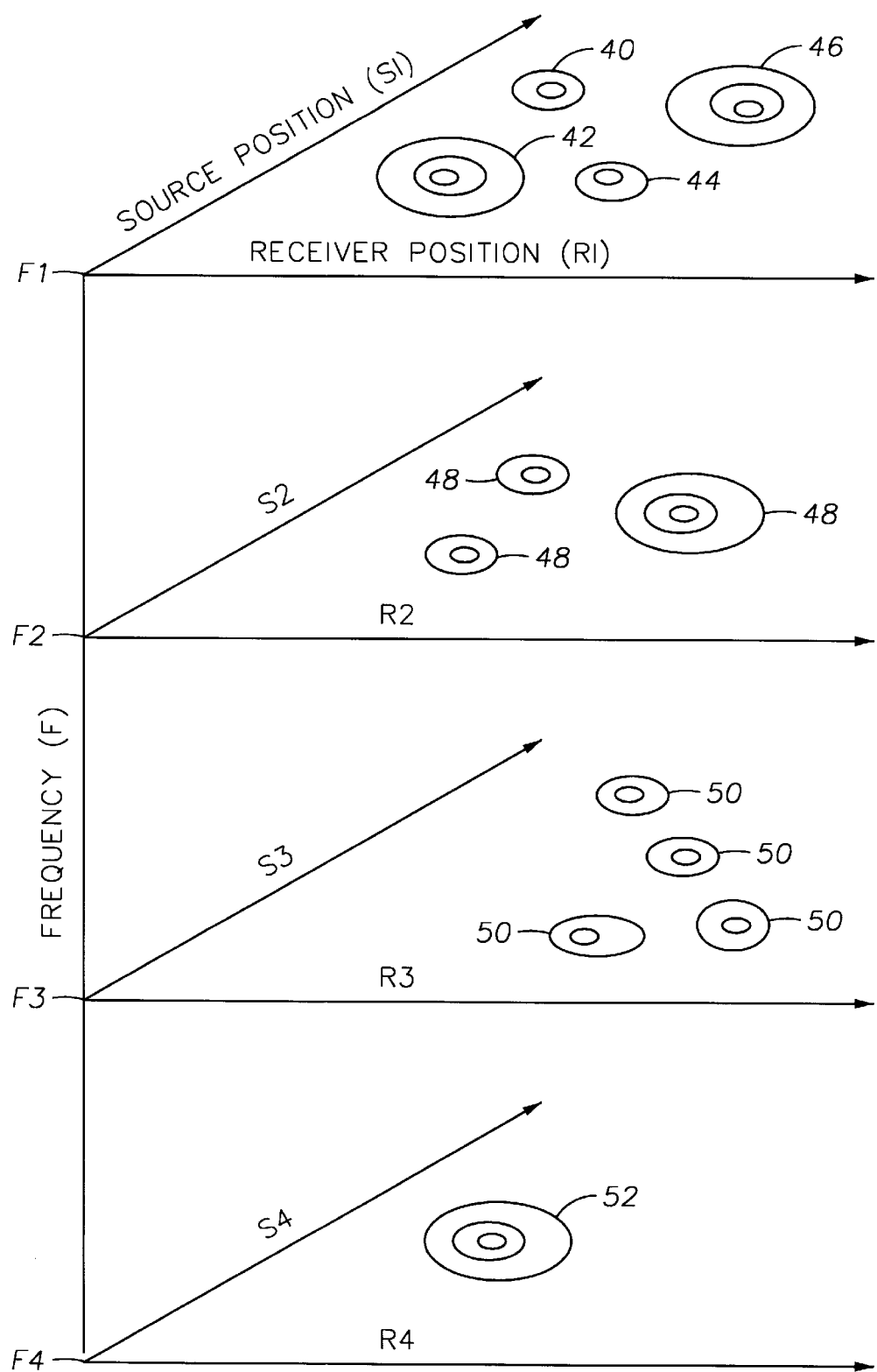
FIG. 3 shows a diagram of an alternative method of presenting individual receiver traces by source depth, receiver depth and frequency.

The result of the transmissivity estimation calculation is a value of transmissivity, for each individual trace, with respect to frequency. Each individual trace has associated with it a source position (depth) and a receiver position (depth). The transmissivity estimation for each trace as a function of frequency can be better understood by referring to FIG. 3. Transmissivity, for any individual frequency, can be plotted on a 2-dimensional graph. In FIG. 3, for example at a first frequency F1, the magnitude of the transmissivity can be represented on a graph having source position S1 on the ordinate axis and receiver position R1 on the coordinate axis. Magnitude of transmissivity can be represented, for example, as contour lines 40, 42, 44, 46 of equal magnitude. A similar 2-dimensional plot can be performed at a second frequency F2. The plot at frequency F2 includes source position on ordinate axis S2 and receiver position on coordinate axis R2. Contour plots, shown at 48 can be used to indicate the magnitude of the transmissivity function at the various source and receiver positions at frequency F2.

Similar 2-dimensional plots are shown at frequencies F3 and F4. The plot at F3 includes corresponding source position S3 and receiver position R3, with its contour plots shown at 50. The plot at F4 includes corresponding source and receiver positions S4 and R4, with contour plots at 52.

The process of determining transmissivity with respect to source and receiver position can be repeated for each frequency in the spectral analysis of each trace.

The transmissivity plots for each frequency can be used to generate connectivity maps for each frequency. One process for generating connectivity maps from the transmissivity plots is called the algebraic reconstruction technique (ART). ART is described, for example, in G. A. McMechan, *Seismic Tomography in Boreholes,* Geophysical Journal of the Royal Astronomical Society, vol. 74, pp 601–612 (1983). Generally, ART can be described as follows. A 2-dimensional grid, similar to one shown in FIG. 2 at 20 can be initialized. One end of the grid can represent the position on the earth's surface of the source well, shown at 20A in FIG. 2. The other end of the grid can represent the position of the receiver well, shown in FIG. 2 at 20B. For each trace, a value of the magnitude of the transmissivity function for that trace, at the particular frequency being analyzed, can be inserted into grid positions occurring generally along a travel path of the seismic energy connecting the source depth and the receiver depth at which each trace was generated. Lines connecting the source and receiver depths of a number of traces will cross at locations where they share common depth and position between the source well and receiver well. At the grid position at which two or more lines cross, the value of transmissivity at that grid position can represent the sum of the transmissivity values for each line passing through that particular grid position. The result can be presented by using a gray scale or color coding corresponding to the total transmissivity magnitude in each grid position. The resulting presentation will appear similar to the connectivity maps shown in FIG. 2. The connectivity maps generated by ART as just described can be generated for each frequency component analyzed in the initial step of frequency analysis. Alternatively, the values of transmissivity magnitude can be summed or averaged over a plurality of frequencies within the frequency range originally analyzed to generate a connectivity map including energy within the plurality of frequencies. It is to be expressly understood that ART is only one of a number of tomographic mapping methods known in the art which may be used to generate the connectivity maps from the transmissivity plots. Accordingly, the invention should not be limited to the use of ART to construct the connectivity maps from the transmissivity plots.

The alternative method of connectivity mapping is also applicable to analysis of signals for which the compressional and shear components have been separated as in the first embodiment of the invention.

Those skilled in the art will devise other embodiments of the invention which do not depart from the spirit of the invention disclosed herein. Accordingly, the invention should be limited in scope only by the attached claims.

What is claimed is:

1. A method of determining continuity of earth formations between wellbores from analysis of seismic energy imparted to the formations at selected of depths in one wellbore and received at selected depths in another wellbore, comprising:

separating compressional and shear components of said seismic energy;

for each of said compressional and said shear components, determining a frequency spectrum of said seismic energy over selected paths, each of said paths including one of said selected depths at which said seismic energy is imparted and one of said selected depths at which said energy is received;

for each of said compressional and said shear components, calculating transmissivity of said earth formations, at individual frequencies, for each of said paths for a plurality of said frequencies in said frequency spectrum;

summing said calculated transmissivity values, for each said individual frequency, for each of said compressional and said shear components, at depth and position locations common to more than one of said paths.

2. The method as defined in claim 1 further comprising presenting said summed calculated transmissivity values as a connectivity map, for each said individual frequency, between said one wellbore and said another wellbore.

3. The method as defined in claim 1 further comprising presenting said summed calculated transmissivity values for each of said compressional and shear components as a connectivity map, for each said individual frequency, for said compressional component and as a connectivity map for said shear component.

4. The method as defined in claim 1 further comprising summing, over a selected range of said frequencies, said summed calculated transmissivity values to generate selected bandwidth transmissivity functions.

5. The method as defined in claim 4 further comprising presenting said selected bandwidth transmissivity functions as a selected bandwidth connectivity map.

6. A method of determining continuity of earth formations between wellbores, comprising:

imparting seismic energy at selected depths in a first wellbore;

receiving said seismic energy at selected depths in a second wellbore;

separating compressional and shear components of said seismic energy;

for each of said compressional and said shear components, determining a frequency spectrum of said seismic energy received at said selected depths over selected paths, each of said paths including one of said selected depths at which said seismic energy is imparted and one of said selected depths at which said energy is received;

for each of said compressional and said shear components, calculating transmissivity of said earth formations, at individual frequencies, for each of said paths for a plurality of said frequencies in said frequency spectrum;

summing said calculated transmissivity values, for each said individual frequency, for each of said compressional and said shear components, at depth and position locations common to more than one of said paths.

7. The method as defined in claim 6 further comprising presenting said summed calculated transmissivity values as a connectivity map, for each said individual frequency, between said one wellbore and said another wellbore.

8. The method as defined in claim 6 further comprising presenting said summed calculated transmissivity values for each of said compressional and shear components as a connectivity map, for each said individual frequency, for said compressional component and as a connectivity map for said shear component.

9. The method as defined in claim 6 further comprising summing, over a selected range of said frequencies, said summed calculated transmissivity values to generate selected bandwidth transmissivity functions.

10. The method as defined in claim 9 further comprising presenting said selected bandwidth transmissivity functions as a selected bandwidth connectivity map.

* * * * *